Sept. 8, 1959  F. C. MITTELL ET AL  2,902,696
PROSTHETIC APPARATUS

Filed Oct. 3, 1955  9 Sheets-Sheet 1

FIG. 1

INVENTORS
N. CHASE
L. POLLOCK
G. J. MATEY
F. C. MITTELL
R. J. DAWSON
J. L. BOWER

BY

William R. Lane
ATTORNEY

Sept. 8, 1959 F. C. MITTELL ET AL 2,902,696
PROSTHETIC APPARATUS
Filed Oct. 3, 1955 9 Sheets-Sheet 2

INVENTORS
N. CHASE
L. POLLOCK
G. J. MATEY
F. C. MITTELL
R. J. DAWSON
J. L. BOWER

BY William P. Lane
ATTORNEY

INVENTORS
N. CHASE
L. POLLOCK
G. J. MATEY
F. C. MITTELL
R. J. DAWSON
J. L. BOWER

BY

ATTORNEY

Sept. 8, 1959   F. C. MITTELL ET AL   2,902,696
PROSTHETIC APPARATUS
Filed Oct. 3, 1955   9 Sheets-Sheet 4

INVENTORS
N. CHASE
L. POLLOCK
G. J. MATEY
F. C. MITTELL
R. J. DAWSON
J. L. BOWER

BY

*William R. Lane*

ATTORNEY

Sept. 8, 1959 F. C. MITTELL ET AL 2,902,696
PROSTHETIC APPARATUS
Filed Oct. 3, 1955 9 Sheets-Sheet 5

INVENTORS
N. CHASE
L. POLLOCK
G. J. MATEY
F. C. MITTELL
R. J. DAWSON
J. L. BOWER

BY William P. Lane
ATTORNEY

Sept. 8, 1959   F. C. MITTELL ET AL   2,902,696
PROSTHETIC APPARATUS
Filed Oct. 3, 1955   9 Sheets-Sheet 7

FIG. 12

INVENTORS
N. CHASE
L. POLLOCK
G. J. MATEY
F. C. MITTELL
R. J. DAWSON
J. L. BOWER
BY William P. Lane
ATTORNEY

United States Patent Office 2,902,696
Patented Sept. 8, 1959

2,902,696

PROSTHETIC APPARATUS

Frank C. Mittell and Norris Chase, Los Angeles, and George J. Matey, El Segundo, Latham Pollock, Los Angeles, Robert J. Dawson, Culver City, and John L. Bower, Downey, Calif., assignors to North American Aviation, Inc.

Application October 3, 1955, Serial No. 538,212

25 Claims. (Cl. 3—1.1)

This invention relates to a device for providing motion to a paralyzed limb of an invalid and in particular relates to a device whereby a partially paralyzed individual can control the operation of a power actuated mechanism for manipulating his own paralyzed arm and hand through various useful functional movements.

Heretofore no apparatus has existed whereby a partially paralyzed invalid who has some slight control and movement of his pedal extremities and by which he can exert a relatively small force, was able to maneuver and manipulate his own totally paralyzed and disabled arm and hand in a useful manner by a power driven mechanism controllable by the invalid's own pedal extremities. Devices for muscular exercise and therapy are well known in the art, but no device has been developed until the present invention whereby the invalid can control and cause his own totally paralyzed limb to respond to the application of external mechanical forces to move it in such a manner as to perform its ordinary and necessary daily functions and movements.

Figure 1:
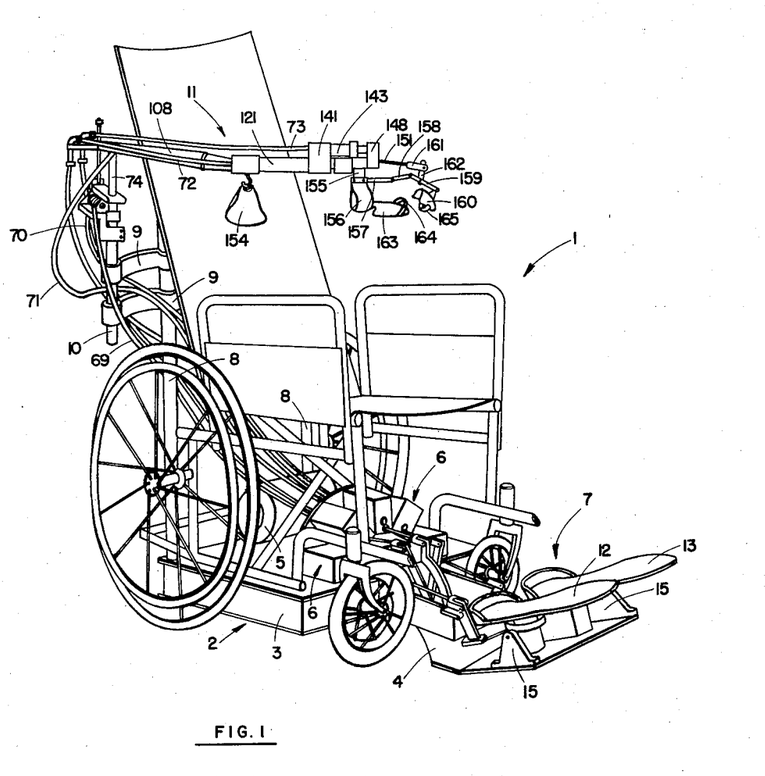
Fig. 1 is a perspective view of a wheelchair positioned on a mechanical embodiment of the arm actuator device of this invention.

The present invention contemplates providing an external source of power and control means which may be actuated by slight movements of the pedal extremities to control the application of power to a series of individual actuator means for reproducing the articulation of a normal limb by means of separate or collective operation of the actuator means. In the device as generally illustrated in Fig. 1 and as applied to a wheelchair, ten separate movements have been provided for, including raising and lowering the arm, swinging the arm right or left about the shoulder as a pivot, bending and straightening the elbow, rotating the wrist in either a clockwise or counterclockwise direction and closing and opening the fingers. All of the foregoing actions are controlled by slight movements of the feet. In the prototype model, illustrated and described herein, the heel of the right foot is depressed to roll the invalid's wrist in an upward direction while the toe is depressed and the heel raised to turn the wrist in a downward direction. By rotating the right foot to the right, the fingers may be closed; while if the right foot is rotated to the left, the fingers may be opened. The left foot may be simultaneously employed, depressing the toe to lower the arm, depressing the heel to raise the arm, rotating the foot to the right to swing the upper arm in, rotating to the left to swing the upper arm out and rolling the foot to the right or left to bend the elbow in or out respectively.

It will be understood that the invention is not limited to the utilization of the above described motions alone but is applicable to whatever motions and forces a partially paralyzed invalid may be able to develop with any portion of his body. Each individual thus presents special problems requiring their own peculiar solutions and adaptations in order to fully utilize those muscles of such a partially paralyzed individual that have sufficient movement and power to perform the controlling operations, but the broad concept of the present invention is fully applicable to such adaptations and alterations in design. It will also be appreciated that, while the invention as disclosed is applied to the right arm of an invalid, it is equally applicable to the left arm and would require only slight modification in the design of the mechanism as described below.

It is an object of this invention to provide a device for manipulating paralyzed or disabled extremities of an invalid by power operated means.

A further object is to provide a power driven device, for manipulating the paralyzed extremities of an invalid, that is controlled by the invalid.

A further object is to provide an invalid controlled power driven device for moving paralyzed extremities of the invalid in such a controlled manner as to allow the invalid to utilize the paralyzed member to perform its normal everyday useful functions.

A still further object of the invention is to provide a power driven device for manipulating a paralyzed extremity of an individual in such a manner as to provide physical exercise and muscular therapy therefor.

Other objects and advantages of the invention will be apparent from a consideration of the following description and claims.

Referring specifically to the drawings, wherein like reference characters have been used throughout the several views to designate like parts, and referring at first to Fig. 1, the invalid's wheelchair 1 is positioned over the base 2 which may be suspended or supported from the wheelchair in a convenient manner, not shown. Base 2 consists of a structural support 3, used for suspending the base 2, attached to a base plate 4 that supports the foot pedal mechanism, which is indicated generally at 7, and the motor-gear reducer unit 5 and selective clutch unit 6. The front portion of plate 4 projects angularly upward and outward. A pair of uprights 8 are attached to and extend vertically above the base, one at each rear corner of the base, and are joined at their upper ends by a cross-member, not shown. Vertically and pivotally adjustably mounted on one of the uprights are the two supporting arms 9 for adjustably carrying the arm actuator vertical support 10. From this vertical shaft is supported the arm actuator mechanism generally indicated at 11, Fig. 1.

Figure 2:
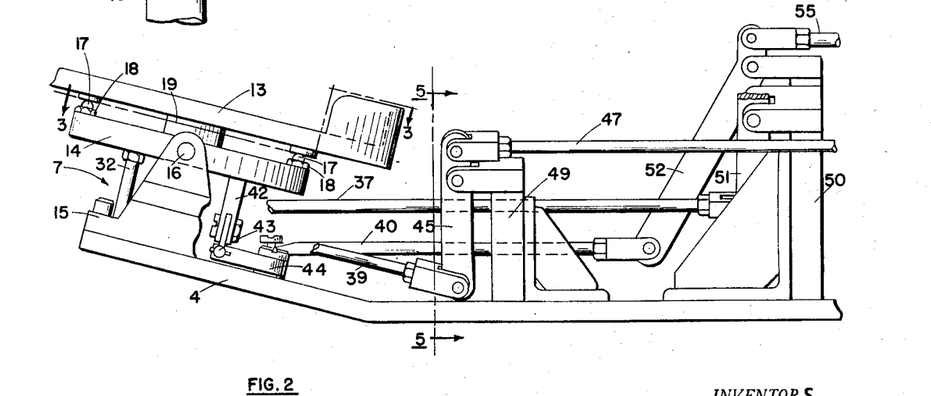
Fig. 2 is a side elevational view of the foot pedal control mechanism and a fragmentary elevational view of the push-pull rod linkage and lever systems of the mechanical embodiment of this invention.
Figure 3:
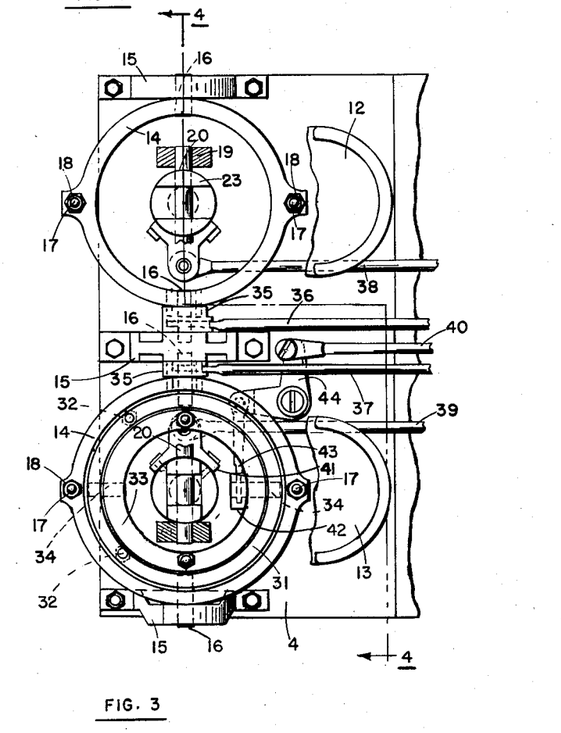
Fig. 3 is a top plan view, partly in section, of the foot pedal control mechanism of the mechanical embodiment of this invention.
Figure 4:
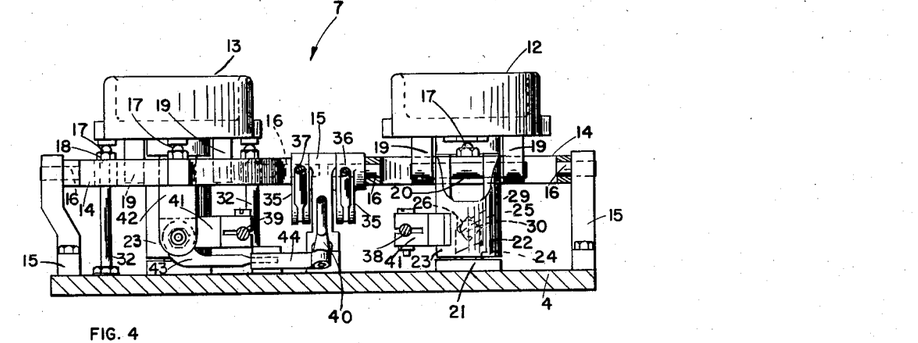
Fig. 4 is a sectional view, partly in elevation, taken substantially in the plane of line 4—4 in Fig. 3.

In the foot pedal mechanism 7, as shown in Figs. 2, 3, and 4, control of arm actuator mechanism 11 is obtained through operation of the foot pedals 12 and 13 by the individual's right and left foot respectively. Pedals 12 and 13 are mounted on gimbal rings 14 which are journaled for tilting about an axis transverse to the pedal axis. Axially aligned bearing pedestals 15 are attached to the base plate 4, one at each outer edge of the base plate and one located centrally between the foot pedals. Transverse trunnions 16 mounted in rings 14 are journaled for swinging movement in pedestals 15. Threadedly connected to each of the gimbal rings 14 on a line parallel to the longitudinal pedal axis are two substantially vertically adjustable studs 17 locked against displacement by nuts 18. These studs provide easily adjustable contact points of support between the gimbal ring and the overlying pedal at two points, one forward of the transverse tilting axis and one an equal distance rearward therefrom. Depending from the underside of each of the foot pedals and spaced an equal distance on either side of the longitudinal pedal axis along the transverse axis are two lugs 19, each of which has one end of horizontal transverse shaft 20 journaled in a bore therein at the lower end of each lug. Extending upwardly from base plate 4 at a point beneath the point of intersection of the transverse and longitudinal axes of the foot pedals is a boss 21. Supported on the boss 21 and extending upwardly therefrom is a substantially vertically extending cylindrical pivot spindle 22 which is secured to the boss by means of a bolt (not shown) extending upwardly through the plate 4 and boss 21 and threadedly engaging the spindle. Rotatably mounted over the spindle is the cylindrical pivot shaft 23 which has a pivot socket 24 to receive the spindle 22. To reduce friction and insure foot pedal control sensitivity the opposing surfaces 25 and 26 of the pivot socket and spindle respectively have matching conical depressions to provide a chamber 29 for an anti-friction ball bearing 30. Surfaces 25 and 26 are separated by means of ball bearing 30 so that pivot shaft 23 rotates and is supported solely on the ball 30. The bifurcated upper end of the pivot shaft is bored to provide a journal in each bifurcation element for shaft 20. Shaft 20 thus provides a pivot connection between the foot pedal and the rotatable shaft 23. It should be noted that the axis of shaft 20 coincides with the axis of trunnions 16 in order to provide free movement of both the pedal plate and gimbal ring in tilting about the transverse axis. The combined boss, spindle and pivot shaft assembly is located on an axis making an angle of 90° with the bent forward end of base plate 4 and would extend upwardly in a true vertical direction if the end of the base plate were horizontal and not angulated upward. Lugs 19 also provide third and fourth points of support for the foot plates in addition to the two points of support provided by the adjustable studs 17.

The structure thus far described is common to both the right foot pedal 12 and left foot pedal 13 and allows either of the foot plates to be tilted fore and aft on a transverse axis, to be rotated on the pivot shaft and spindle in either a clockwise or counterclockwise direction, or a combination of these two movements can be effected due to the universal joint type of connection between the foot pedal and the pivot shaft.

In the left foot pedal mechanism an additional controlling motion of the invalid's foot is provided. Lying in the plane of and located inwardly of gimbal ring 14 is the fixed ring 31 which is rigidly supported from the base plate by studs 32. The transverse trunnions 16 of the left foot pedal differ from those of the right pedal in that they are longer and the inner end of each extends into and is journaled in the fixed ring 31. Lying within the fixed ring and spaced inwardly therefrom is an inner gimbal ring 33 which is journaled for tilting about an axis parallel to the longitudinal axis of the left foot pedal 13. Longitudinal trunnions 34 are mounted in the inner gimbal ring 33 and are journaled for swinging movement in fixed ring 31. The rearward trunnion 34 extends beyond the inner peripheral surface of inner gimbal ring 33 for a purpose to be subsequently described. Threaded into gimbal ring 33 on the transverse axis thereof are two substantially vertically adjustable studs 17 with locking nuts 18, to provide adjustable contact points between foot plate 13 and gimbal ring 33 as previously described for gimbal rings 14.

It will be understood that this third type of motion described above could also be employed with the right foot pedal thus giving three separate types of controlling motions for each foot or a total of six separate types of functions controllable with the present invention, although in the prototype device described herein only five motions are used.

To transmit the foot pedal motion cranks 35 are interposed between the right and left gimbal rings 14 and the center bearing pedestal 15. Each crank is rigidly secured to its adjoining gimbal ring so as to move integrally therewith and extends downwardly therefrom at an angle of approximately 90° relative to the plane of the gimbal rings. Cranks 35 are bored to allow free passage of the trunnion pins 16 therethrough. The push-pull rods 36 and 37 are pivotally attached to the lower ends of the respective right and left hand cranks. Secured to each pivot shaft 23, as by cap screws, is a clamp 41 having a slotted end for a pivotal pin connection to one end of push-pull rods 38 and 39 for the respective right and left hand pedal assemblies. On the extension of the rearward longitudinal trunnion 34, previously mentioned, depending link 42 is mounted and rigidly attached to the inner gimbal ring 33 so as to transmit the swinging motion of the gimbal ring to one end of transverse rod 43 which is pivotally mounted at the lower end of link 42. The other end of rod 43 is pivotally connected to one end of bellcrank 44 which is also pivotally mounted on base plate 4 so as to effect a longitudinal movement of the push-pull rod 40 pivotally connected to the other end of the bellcrank. By means of the above described systems of linkages, the tilting and turning movements of the foot pedals are converted into back and forth longitudinal movements of the five longitudinal push-pull rods.

Figure 5:
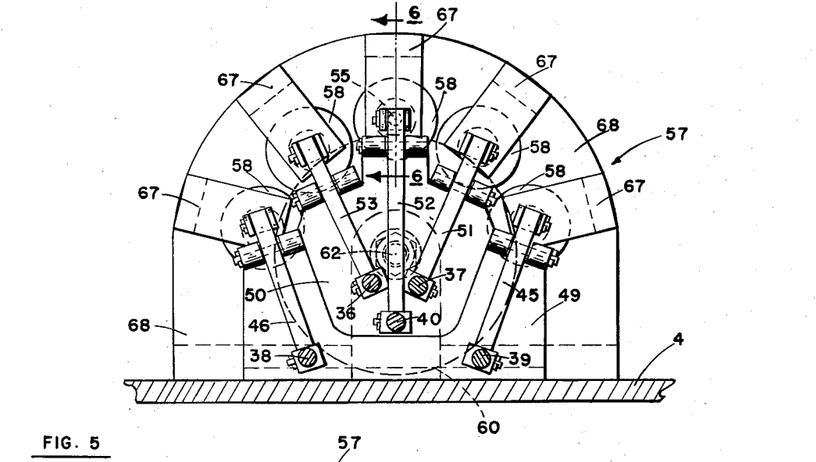
Fig. 5 is a front elevational view, partly in section, of the clutch assembly of the mechanical embodiment taken in the plane of line 5—5 in Fig. 2.

The nominal forces transmitted by the push-pull rods are multiplied by means of levers before being transmitted to the selective clutch unit 6, as shown in Figs. 2 and 5. For the left hand pedal mechanism rod 39 is pivotally attached to the lower end of lever 45 and push-pull rod 47 is pivotally attached to the upper end of the lever which is fulcrumed on a supporting bracket 49 attached to base plate 4. For the right hand pedal mechanism rod 38 is connected to lever 46 and rod 48 (not shown) is connected to the upper end of lever 46 and the lever is fulcrumed on bracket 49 in a manner similar to that for the left hand pedal mechanism.

To the rear of bracket 49 is located bracket 52 on which are fulcrumed levers 51, 52 and 53. Rod 37 is pivotally attached to the lower end of lever 51 while push-pull rod 54 (not shown) is pivotally attached to the upper end thereof. The right hand push rod 38 is similarly pivotally attached to lever 53 while push-pull rod 56 (not shown) is pivotally attached to the upper end of lever 53. Rod 40 from bellcrank 44 is pivotally attached to the lower end of lever 52 while push-pull rod 55 is pivotally attached to the upper end thereof.

Figure 6:
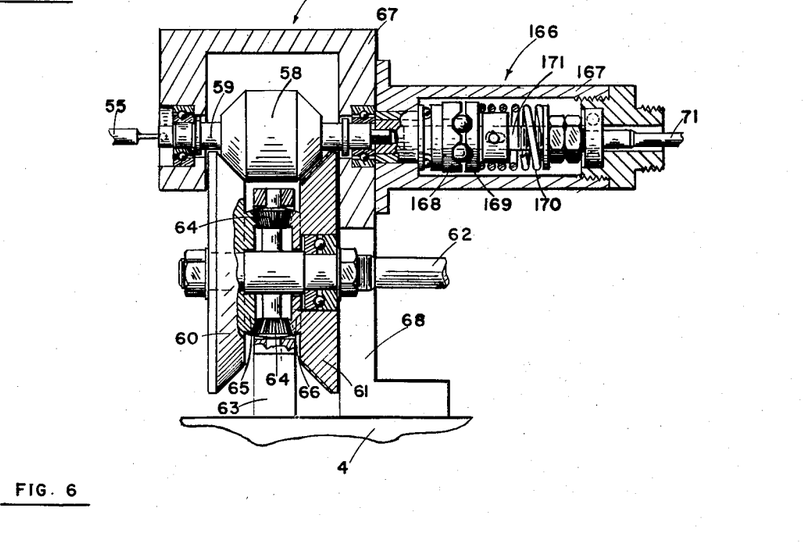
Fig. 6 is a longitudinal sectional view of the clutch assembly taken in the plane of line 6—6 in Fig. 5 and showing the torque-limiting clutch device.

Motion imparted to rods 47, 48, 54, 55, 56 is transmitted to a plurality of clutches 57 to apply power selectively from either one of a pair of continuously driven contra-rotating clutch plates, driven by an electric motor through a gear reduction unit. Each clutch 57 comprises a spool 58 mounted on a shaft 59 and movable axially with the shaft to alternately engage clutch plates 60 or 61. When centered in the neutral position, spool 58 is stationary but upon a slight movement in either direction the frusto-conical face of the clutch spool operatively contacts the opposing frusto-conical surface of either clutch plate 60 or 61 depending upon the longitudinal direction of spool movement and is rotatably driven thereby. Plate 60 is attached to power shaft 62 and is driven by the motor through a gear box. Plate 61 is mounted on shaft 62 by means of an anti-friction bearing and is free running on the shaft. Power shaft 62 is supported for rotation by any suitable conventional bearing structure (not shown). A spider 63 attached to base plate 4 is positioned between clutch plates 60 and 61 to carry idler gears 64. Integral with plate 60 is bevel gear 65 while bevel gear 66 is similarly integral with or attached to plate 61. Bevel gear 65 is driven by means of shaft 62 and in turn drives the idler gears 64 thereby causing bevel gear 66 and free-running clutch plate 61 to rotate counter to gear 65 and plate 60. The U-shaped block comprising clutch housing 67 provides support for anti-friction bearings for the longitudinally adjustable clutch shaft 59. A plurality of clutch housings are supported at spaced intervals around the periphery of the clutch plates 60, 61 by means of the U-shaped vertical plate 68 which is fixed to the base plate 4. The clutch shaft and bearing structure are designed to allow a back and forth movement of clutch shaft 59 of between approximately 1/32 to 1/16 of an inch.

As an accident prevention means to preclude possible injury to the invalid operator, a torque limiting clutch indicated generally at 166 is incorporated in the drive mechanism. Since this is a conventional type of overrunning clutch, it will be only generally described. A torque limiting clutch housing 167 is attached to the rear face of each selective clutch housing 67. Located within and at the forward end of the housing is the driving clutch plate 168 which has a forwardly extending hollow shaft integral therewith. This hollow shaft is of a square, hexagonal or similar configuration or may be splined or keyed in order to make a slidable driving connection with the mating reduced diameter rearward end of shaft 59. Opposite clutch plate 168 is driven clutch plate 169 which is slidably mounted for longitudinal movement on driven shaft 171 by means of a pin and slot arrangement. Both clutch plates have a plurality of matching indentations with a spherical ball mounted between each matching pair of indentations to form a detent means. The adjustable spring tensioning device 170 permits the clutch to be set so that when a predetermined torque level is exceeded the balls ride up out of the restraining detents and no longer transmit a rotational force to the driven clutch plate 169 and shaft 171. Fixedly attached to the rearward end of each torque limiting clutch shaft is one of the five flexible drive cables 69, 70, 71, 72, 73. Axial movement of push-pull control rod from the foot pedal mechanism moves spool 58 into contact with either clutch plate 60 or 61 and causes the spool and clutch shaft to rotate clockwise or counterclockwise. This rotational movement in turn is transmitted through the torque limiting clutch to the flexible drive cable attached to each particular clutch shaft. The direction of rotation of the flexible drive cable is determined by selective engagement of the spool 58 with either clutch plate 60 or 61. The operation of each clutch 57 is thus independent of the operation of any other clutch unit and depends solely on the application of a force to a particular foot pedal in a particular manner.

Figure 8:
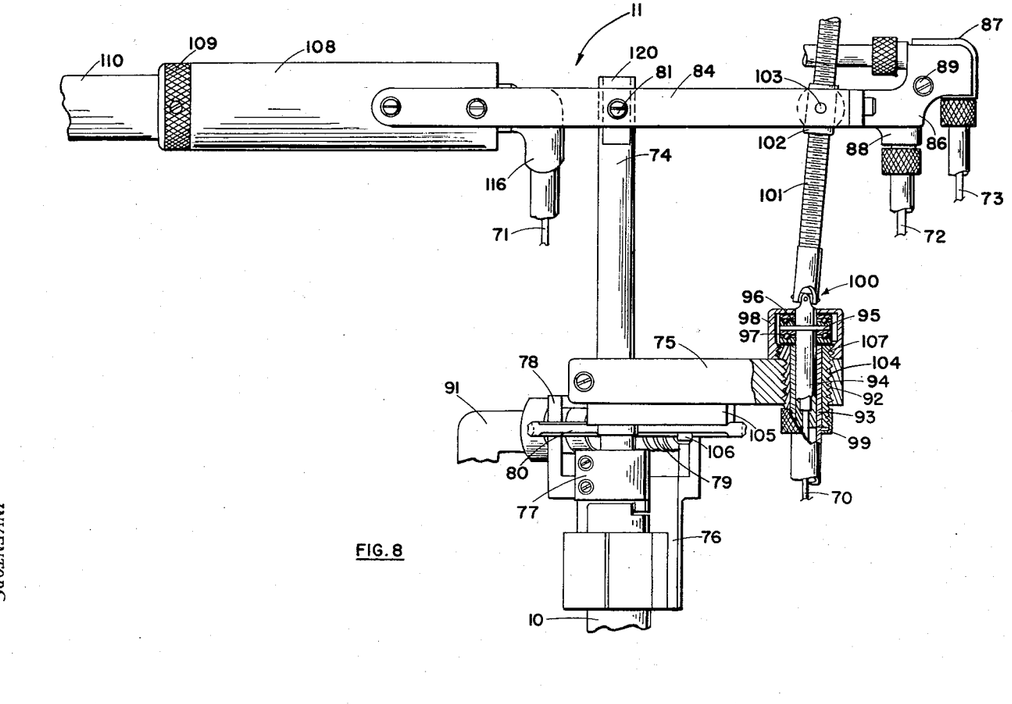
Fig. 8 is a partial side elevational view, partly in section, of the shoulder portion of the mechanical embodiment of the arm actuator device.
Figure 9:
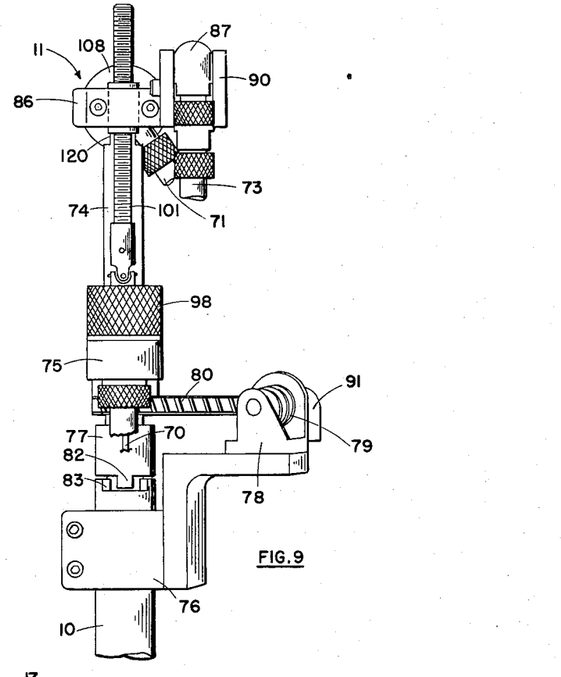
Fig. 9 is a rear elevational view of the mechanical embodiment of the arm actuator mechanism.

The arm actuator mechanism 11 is pivotally mounted at shoulder fulcrum pin 81 on the arm actuator vertical shaft 74 for movement in a vertical plane, as shown in Fig. 8. Shaft 74 is vertically supported for rotation in a socket formed by a vertical cylindrical axial bore (not shown) in the upper end of the arm actuator vertical support 10. The bottom of the bore and the matching bottom surface of the arm actuator vertical shaft 74 are bored to form matching conical depressions to provide a chamber for an anti-friction ball bearing mounting (not shown) similar to the foot pedal spindle mounting. Rigidly but detachably secured to the arm actuator vertical shaft is stop collar 77 having a downwardly projecting lug 82. The upper end of support 10 is slotted to provide shoulder stops 83 which will be contacted by lug 82 to prevent rotation of shaft 74 and arm actuator mechanism 11 beyond a predetermined point. Rigidly attached to the stationary vertical support 10 is worm bracket 76. Integral with or attached to the worm bracket is the worm support 78 having a shaft, on which worm 79 is mounted, journaled therein. The driving end of flexible drive cable 69 is swedged or otherwise rigidly attached to the shaft on which the worm 79 is fixedly mounted so that the worm is driven by rotation of the flexible cable extending from the clutch unit through elbow fitting 91. Rigidly, horizontally attached to the vertical shaft 74 is worm gear sector 80 which is driven by worm 79 to rotate the vertical shaft. The upper end of the vertical shaft is formed with two opposing flats 120 and is bored to provide a journal for the shoulder fulcrum pin 81. Parallel pivot arms 84, 85 are pivotally supported on the fulcrum pin, one on either side of vertical shaft flats 120. Bolted or otherwise rigidly attached to the rearward end of each of the pivot arms is one leg of the angle bracket 86 which supports and positions the flexible cable elbow fittings 87, 88 by means of a bolt 89 and hold down plate 90.

Figure 7:
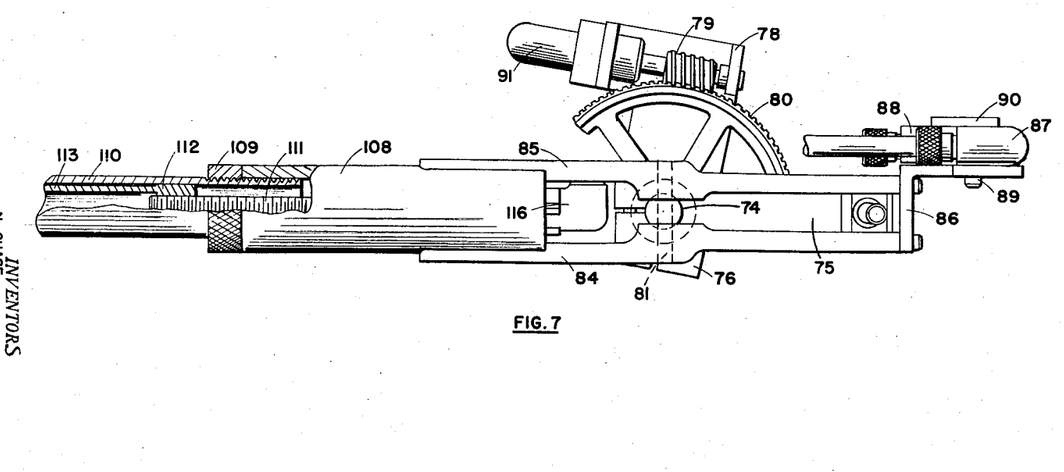
Fig. 7 is a partial top plan view, partly in section, of the shoulder portion of the mechanical embodiment of the arm actuator device.

Rigidly but detachably mounted on the vertical shaft 74 is the screw-jack bracket 75 having a threaded hole 104 extending therethrough. The screw-jack bracket is mounted to extend rearwardly with the centerline of threaded hole 104 lying in the same vertical plane as the longitudinal axis of the upper portion of the arm actuator mechanism 11. For greater rigidity, gear sector 80 is secured to the screw-jack bracket through a spacer block 105 by bolt 106. Threaded into hole 104 in the screw-jack bracket is a cylindrical sleeve 92 having an annular shoulder 107 that rests on the upper surface of the bracket. Pressed or otherwise fitted within the sleeve is a bushing 93. Journaled for rotation within this bushing is the intermediate shaft 94 which has an annular thrust collar 95 integral therewith near the upper end of the shaft. Seated on the flush upper ends of sleeve 92 and bushing 93 is an anti-friction type thrust bearing 97 which supports the thrust collar 95 on its upper surface. Mounted on the upper annular surface of the thrust collar is thrust bearing 96. Supporting and aiding in positioning the bearing structure elements in spaced relation is the bearing retainer cap 98 threaddedly engaging the outer surface of the annular shoulder 107. The flexible drive cable 70 is swedged or otherwise rigidly attached to the lower end of intermediate shaft 94. The flexible cable connection is completed by attaching the flexible cable sheathing to the projecting lower end of the sleeve 92 by means of tubing nut 99. Threaded screw jack shaft 101 is connected at one end to intermediate shaft 94 by universal joint 100. Threaded onto and engaging the screw jack shaft is the nut 102 pivotally mounted for swinging in a vertical plane on screw jack pivot pin 103 which is supported at its ends in pivot arms 84 and 85. All of the screw jack devices described herein are reversible in the sense that they may be driven in either direction so as to produce motion in opposite directions but are irreversible in the sense that the force of gravity acting on the arm or hand will not cause the screw jacks to move.

When flexible drive cable 69 is rotated in one direction worm 79 is also rotated and drives the gear sector 80 which, being rigidly attached to the vertical shaft 74, in turn swings the arm actuator mechanism 11 about the vertical shaft. Reversing the direction of rotation of the flexible cable drive by means of the shiftable selective clutch unit 57 produces a reverse motion of the arm actuator. Similary, flexible drive cable 70 drives threaded screw jack shaft 101 through pivotally attached screw jack nut 102 to raise or lower the arm actuator mechanism 11 in a vertical plane, depending on the direction of rotation of the flexible cable drive. By means of these two flexible cable drives and the actuating mechanisms therefor the vertical and horizontal motions of an individual's upper arm about the shoulder joint can be simulated.

Rigidly secured to the forward end of the horizontal pivot arms 85, 86 is the elbow screw jack housing 108. Adjustably threadedly connected to the inner surface of the housing cylinder is the adjustable sleeve 110 which is fixed in position by the adjustable sleeve lock nut 109. Sleeve 110 provides longitudinal adjustment to suit the arm length of an individual. Internally of the adjustable sleeve and slidably mounted therein on the elbow screw jack shaft 111 and engaging the same is the elbow screw jack nut 112. The rearward end of the screw jack shaft has an annular thrust collar (not shown) mounted between two anti-friction bearings (not shown) in a manner similar to the thrust bearing assembly described in connection with the screw jack assembly for vertical motion of the arm actuator mechanism 11. Flexible drive cable 71 is rigidly attached to the rearward end of screw jack shaft 111 through elbow fitting 116. Attached to or integral with nut 112 is the forwardly extending screw jack nut sleeve 113 located interiorly of sleeve 110. Integral with sleeve 113 and of a reduced diameter, the screw jack sleeve extension 117 projects in a forward direction through an opening 115 in the adjustable sleeve cap nut 115 and has a cylindrical hole at the flattened forward end thereof to receive hinge pin 128. On one side of nut 114 two similar lugs 118 extend outwardly, one above the other, from the cylinder axis and are drilled to accommodate vertical hinge pin 127 which pivotally secures one end of elbow link 119 to the cap nut. Forward of the elbow screw jack housing 108 and a spaced lateral distance from the longitudinal axis thereof is the forearm portion of the arm actuator mechanism comprising the wrist screw jack housing 121. Concentric with and rigidly mounted on this housing at the rearward end thereof is the wrist screw jack housing sleeve 124 having lugs 125 and 126 which are bored to accommodate vertical hinge pins 128 and 129 respectively. The forward end of the elbow link is pivotally attached to the housing sleeve 124 by means of the vertical hinge pin 129 in lugs 126. Similarly, the flattened forward portion of the sleeve extension 117 is pivotally secured to the housing sleeve 124 at outstanding lugs 125 by means of hinge pin 128. This hinged linkage arrangement permits the forearm of the arm actuator mechanism to be swung or moved laterally in a substantially horizontal plane and thus to simulate the elbow movement of a normal individual. The reduction in diameter of the sleeve extension 117 from that of the integral sleeve 113 forms an annular shoulder stop 130 which abuts the inner surface of cap nut 114 to limit the forward travel of sleeve extension 117 and, consequently, the outward movement of the wrist screw jack housing 121. From Fig. 10 it will be seen that when sleeve extension 117 is at the forward limit of its travel the longitudinal axis of wrist screw jack housing 121 is parallel to and laterally spaced from the longitudinal axis of the elbow screw jack housing 108.

Figure 10:
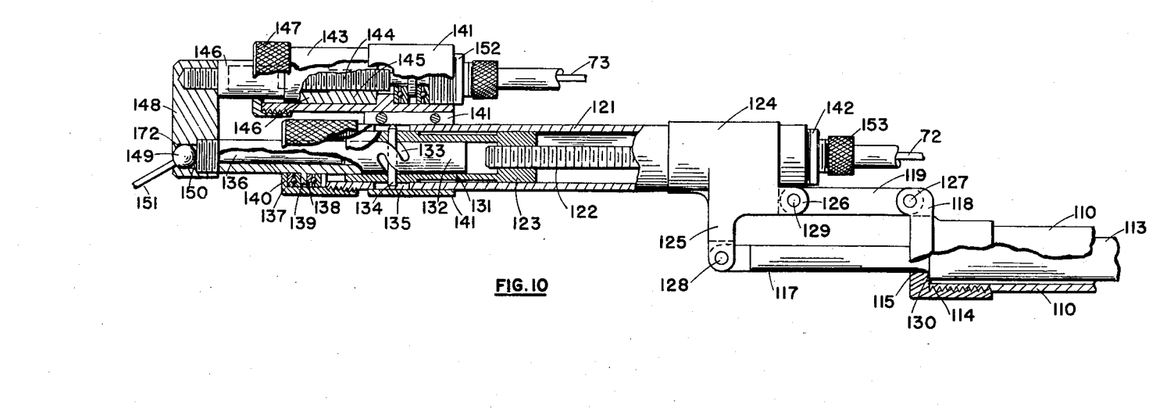
Fig. 10 is a partial top plan view, partly in section, of the forward portion of the mechanical embodiment of the arm actuator mechanism.
Figure 11:
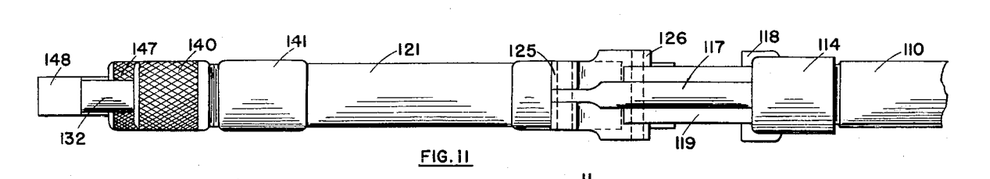
Fig. 11 is a partial side elevational view of the forward portion of the mechanical embodiment of the arm actuator mechanism.

Located interiorly of wrist screw jack housing 121 at the rearward portion thereof and axially coincident therewith is wrist screw jack shaft 122. Slidably mounted within the housing and engaging threaded screw jack shaft 122 is nut 123. Attached to or integral with the nut is cylindrical sleeve 131 extending forwardly therefrom and slidable within the housing 121. Cam follower pin 134 is fixedly mounted transversely in sleeve 131 at a point intermediate the ends thereof with the ends of the pin projecting beyond the sleeve into longitudinal guide slots 135 formed in the wall of housing 121. Rotatably mounted within sleeve 131 is cylindrical inner sleeve 132 which projects beyond the end of wrist screw jack housing 121 and which has helical cam slots 133, intermediate the ends of the sleeve, through which the pin 134 projects. The cam slot contour is such that as follower pin 134 travels forward or backward, in conformance to the movement of the nut 123, the inner sleeve rotates about its own axis, being constrained against longitudinal movement by means of the integral inner sleeve annular thrust collar 139 mounted between anti-friction thrust bearings 137 and 138, with the whole bearing assembly being positioned and retained by the housing cap nut 140 threadedly engaging and closing the forward end of wrist screw jack housing 121. The rearward end of wrist screw jack shaft 122 is mounted in a journal bushing (not shown) within closure plug 142 and has a conventional annular thrust collar and bearing assembly (not shown) similar to the one at the forward end of housing 121. Flexible drive cable 72 is rigidly connected to the rearward end of wrist screw jack shaft 122 and the flexible cable conduit is fixedly attached to the outer end of plug 142 by means of a conventional tubing connector 153. Rigidly mounted in a clamp 141, which is attached for rotation about cylindrical housing 121, on an axis parallel to and spaced laterally outwardly from the axis of wrist screw jack housing 121 is finger actuating screw jack housing 143. Axially coincidentally mounted within housing 143 is a screw jack shaft 144 which is journaled in a bushing (not shown) mounted within closure plug 152 and which has a typical thrust collar and bearing assembly (shown in part) similar to the one described previously in conjunction with the wrist actuating screw jack shaft. Slidably mounted within housing 143 and engaging the threaded screw jack shaft is nut 145. Attached to or integral with the nut and extending forwardly therefrom is cylindrical sleeve 146 which is slidable within the housing 143. A portion of the sleeve intermediate the ends thereof is of a reduced diameter to form an annular shoulder stop and limit the forward movement of the sleeve when the stop abuts the housing cap nut 147 which threadedly engages the forward end of the housing. The sleeve extends through a cylindrical opening in the cap nut and has the tip end thereof further reduced in diameter and threadedly engaging the outer end of the link block 148. The inner end or other end of link block 148 is bored to form a socket 150 for ball swivel 149 and is counterbored and threaded to receive the threaded outer end of pin 136 which is telescopically mounted within sleeve 132. The opposite face of link block 148 is drilled and countersunk to provide access for actuator rod 151 to ball swivel 149 and also to form an annular shoulder 172 to retain the ball swivel. One end of actuator rod 151 is rigidly attached to the ball swivel which is restrained against translational movement by the walls of socket 150, shoulder 172 and the end of pin 136 but which is free to rotate except as limited by the projecting actuator rod. As finger screw jack shaft 144 is rotated to advance the screw jack nut and thereby also the integral sleeve 146 and the link block 148, the pin 136 is moved forward telescopically within the longitudinally fixed inner sleeve 132 and the link block moves away from the outer end of inner sleeve 132 which forms a stop to limit the rearward travel of the finger actuating mechanism.

Rigidly attached to the rotatable sleeve 132 on the projecting end thereof is wrist support clamp 155 from which depends rigid wrist support 156, as shown in Fig. 1. The wrist clamp and sling form a unitary structure with sleeve 132 so that as the sleeve is caused to rotate by operation of the wrist screw jack shaft 122, the clamp and sling are rotated through a corresponding arc in the same direction of rotation. Rigidly attached to the clamp 155 and extending forwardly in a substantially horizontal direction is finger link 157. Intermediate link 158 is pivotally attached to the outer end of stationary link 157 and has an endlink 159 pivotally attached at its outer end. These two pivots correspond to the joints of a finger. Finger pads 160 rigidly depend from the outer end of the end link and have a finger strap 165 for supporting the fingers on the pads. In the present embodiment, the finger pad and strap were designed to accommodate only the first two fingers of an individual's hand. Rigidly attached to the end link 159, intermediate the ends thereof, is the upstanding link 162 which is pivotally attached at its upper end to the longitudinally adjustable clevis link 161 which threadedly engages the outer end of finger actuator rod 151. Integral with and projecting forwardly from the lower edge of wrist sling 156 is rigid thumb support 163 with attached thumb strap 164. Suspended from a hook or other suitable means of support at any convenient intermediate location along the arm actuator mechanism 11 is the arm support sling 154. In operation, the arm is supported horizontally under the arm actuator mechanism by the sling and the wrist is supported in wrist support 156 with the thumb extending forwardly along thumb support 163 and attached thereto by means of thumb strap 164. The first two fingers of the suspended hand are placed against finger pads 160 and strapped thereto. This positions the hand in an open grasping configuration so that as actuator arm 151 is advanced by means of the finger screw jack mechanism the finger actuator linkage system swings downwardly and inwardly moving the fingers toward the thumb and results in a closing of the gap between the fingers and thumb. On reverse rotation of the jack screw mechanism, the fingers swing out and upwardly to assume a more open position of the hand. By moving the fingers toward the thumb, the hand may be made to grasp any object that is positioned between the thumb and fingers. The positioning of the hand in proximity to an object to be grasped by the fingers is accomplished by utilization of the available horizontal and vertical shoulder movements, the elbow bending movement and rotation of the wrist, either individually or in combination. The subsequent effective utilization of the grasped object so as to perform a useful function is also dependent on these same motions.

In operation the wheelchair supporting the partially paralyzed individual is positioned over the mechanism as shown in Fig. 1. The base 2 may or may not be supported from the wheelchair, as desired. The disabled arm of the individual is comfortably suspended from beneath the arm actuator mechanism 11 in an extended manner by means of the elbow sling 154, the wrist support 156, thumb support 163, and finger support 160. The thumb and fingers are held lightly but firmly against their respective supports by the straps attached thereto. The driving motor and connected clutch drive mechanism are started by the paralyzed individual by pressing a stop-start button (not shown) with his foot. This button may be located between the foot pedals, alongside either one of the pedals or in any convenient location. By manipulation of either one or both feet, motion is imparted to the individual push-pull rods of one or more of the five linkage systems described in detail above. The motion of any push-pull rod moves the attached clutch spool into frictional driven contact with one or the other of the contra-rotating clutch plates—selection of the particular clutch plate depending on the direction of movement of the foot. The flexible drive cable attached to the particular spool is thereby caused to rotate and this in turn rotates the worm or the particular screw jack shaft to which the driving end of the cable is fixedly attached. Rotation of the worm drives the worm gear sector 80 to rotate the arm actuator vertical shaft 74 while rotation of the screw jacks cause the individual nuts mounted on each screw to move longitudinally in either a forward or a rearward direction. As previously described in detail, operation of the worm and the four screw jacks produces horizontal and vertical movement of the arm about the shoulder, bending and straightening of the elbow, rolling and straightening of the wrist and closing and opening of the hand. More than one of these operations may be performed concurrently and an experienced operator is able to simultaneously control and operate all of the motions.

Examples of a few of the many useful functions that can be performed with this mechanism by an experienced partially paralyzed individual include feeding himself, picking up a glass of water and drinking therefrom through a straw, playing chess, turning the pages of a book, typing on an electric typewriter and operating a tape recorder.

If the paralyzed individual has sufficient power and movement in his pedal extremities to make use of the third type of motion by his right foot, i.e. rocking or rolling the foot from one side to the other, it would be feasible to incorporate an additional screw jack device to provide an up and down flexing motion to the wrist. Such a screw jack could advantageously be located alongside the wrist and finger actuating screw jacks. A wrist flexing motion was not incorporated in the prototype device described herein due to limitations in movement of the pedal extremities of the individual for whom the mechanism was built.

The screw jack mechanism as described above has the inherent limitation of producing motion at a uniform rate. Under certain circumstances, a slowing down or speeding up of the rate of movement of the mechanism is desirable, as where great accuracy is required in positioning the arm or to reduce the time consumed in performing a particular operation. To produce a finer degree of control and to allow the speed of movement of the component members of the arm actuator to be varied at will, the modification shown in Figs. 12, 13, 14 and 15 was devised. In this modification the worm gear mechanism and each screw jack mechanism are replaced by a hydraulic cylinder and piston which produce the required arm movement upon the controlled application of fluid pressure thereto. The selection of the desired arm movement is accomplished by correctly positioning one or both of the foot pedals, as in the mechanically actuated arm. However, in this modification of the basic invention, each foot pedal controls a group of hydraulic valves which in turn meter pressurized hydraulic fluid which is carried through conduits to actuate the pistons located on the arm actuator mechanism. Each valve controls movement of a particualr piston in a specific direction, while the rate of motion is controlled by the amount of pedal movement which controls the orifice area of a metering valve and thereby the rate of flow of hydraulic fluid to or from a particular actuating cylinder and piston.

Figures 13, 14:
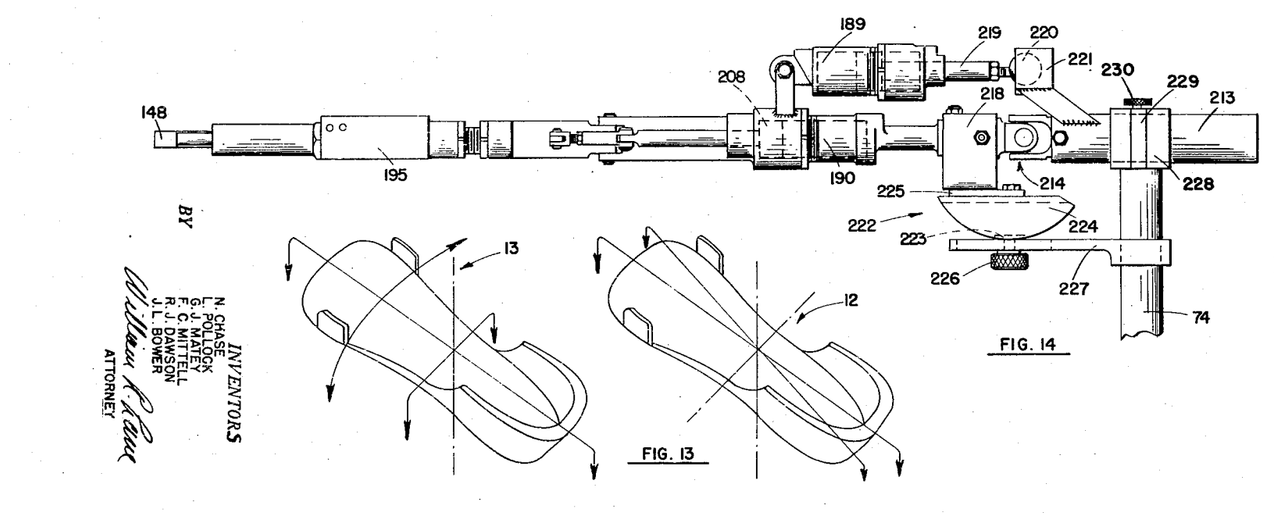
Fig. 13 is a diagram of the controlling foot pedal movements for the hydraulic embodiment of the arm actuator device.
Fig. 14 is a side elevational view of the hydraulic embodiment of the arm actuator device.

In the hydraulic embodiment of this invention, the left foot pedal controls the basic movements of the arm as follows: left toe down moves the arm down and heel down (toe up) produces arm elevation, foot inversion (rolling foot to left) moves arm in horizontally and foot eversion (rolling foot to right) moves arm out horizontally, toeing to the left bends the elbow and toeing to the right straightens the elbow. The right foot pedal controls the wrist and finger movements. With the pedal parallel to the longitudinal axis of the unit, toe down moves the fingers to close the grasp and heel down (toe up) opens the grasp. When the pedal is rotated to toe out at a predetermined angle to the unit longitudinal axis it controls the wrist movement. In this angulated toe out position, toe up supinates (rolls upward) the wrist while a heel up movement pronates (rolls down) the wrist. The motion of the arm at any given instant is the result of one or more piston motions which in turn result from the pedal positions at that given instant.

Figure 12:
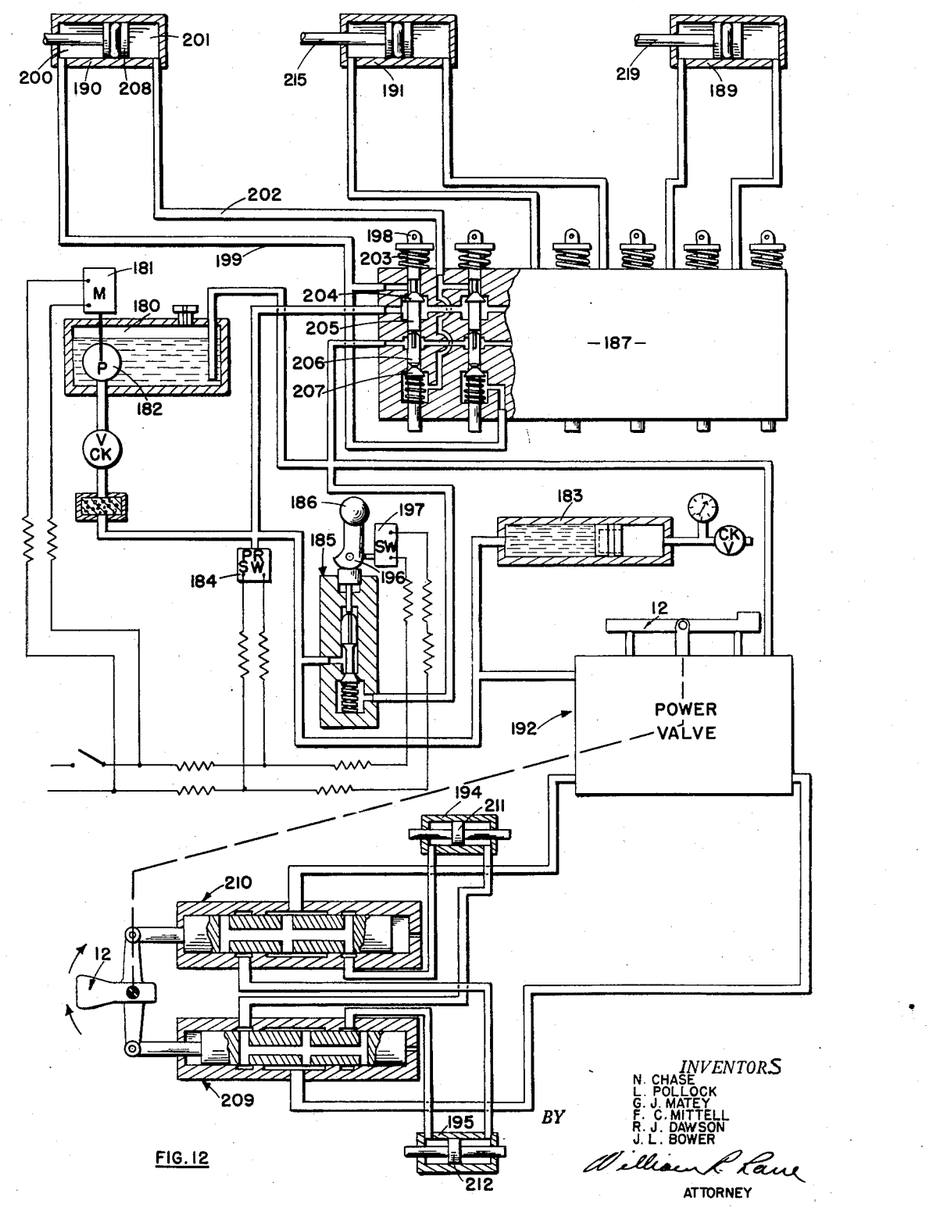
Fig. 12 is a schematic diagram of the hydraulic system for a hydraulic embodiment of the arm actuator device.

Referring to the schematic diagram of Fig. 12, reservoir 180 has a hydraulic pump 182 located therein and driven by motor 181. The discharge of the pump is connected to a hydraulic accumulator 183 after passing through the conventional check valve, filter and pressure switch 184 which controls the motor operation to maintain the hydraulic operating pressure between 200 pounds per square inch (p.s.i.) and 475 p.s.i. The pump discharge is also led by appropriate conduits to each of the power control valve blocks 187, 192 operated by the left and right foot pedals respectively. Also connected to the pump discharge pressure is the combination system relief and manual dump valve 185. This is a single poppet type valve which allows hydraulic fluid to by-pass back into the reservoir when a certain predetermined system pressure is exceeded and the spring loaded valve opens. The poppet valve has a stem with a cam follower on the end thereof which operatively contacts a cam 196 attached for rotation to shaft 186. The cam and shaft are manually operated by a dump valve lever (not shown) which is attached to some portion of the invalid operator's body over which he has a certain degree of movement and control. In this modification, the lever was made for attachment to the knee of the operator. The cam also operates to open a normally closed micro-switch 197 which opens the motor circuit and prevents operation of the pump. If for any reason the invalid operator becomes unable to operate or properly control the mechanism, he has merely to operate the dump valve and microswitch by a single movement of that portion of his body to which the dump valve lever is attached, the pressure in the hydraulic system will then be reduced to zero and all motions of the arm mechanism will cease immediately and can be resumed at will by a reverse motion which closes the dump valve and microswitch and which then starts the motor and pressurizes the hydraulic system. Each individual power control valve consists of a double-poppet three-way valve accurately ground and lapped for zero leakage under operating pressure so that the hydraulic actuating pistons and their applied loads may be maintained in any given position indefinitely against the force of gravity. When the upper poppet valve stem 198 is depressed a slight amount against the force of the shut-off spring 203 by movement of the foot pedal, the upper poppet valve 204 unseats to allow pressure fluid to enter conduit 199 and thence into the cylinder work chamber 200. However, lower poppet valve 207 still remains closed and prevents any flow of hydraulic fluid from cylinder chamber 201 through conduit 202 until upper poppet valve 204 is depressed an additional amount so that the lower stem 205 operatively contacts the member 206 to unseat lower poppet valve 207. With lower poppet valve 207 open fluid in cylinder chamber 201 can return to reservoir 180 and the piston 208 will move to the right. Each actuating cylinder thus requires two double poppet three-way valves acting together with one valve providing for movement of the piston in one direction and the second valve providing for the return movement of the piston. The control valves for the actuating cylinder 189 to raise and lower the arm, actuating cylinder 190 to bend and straighten the elbow, and actuating cylinder 191 to rotate the arm horizontally are all located in the left foot power control valve block 187.

In this particular embodiment, due to physical limitations of the invalid for whom the apparatus was constructed, one set only of two double-poppet three-way valves was used for the right foot control valve block 192. In order to secure the desired four control motions for the right foot, two transfer valves 209 and 210 of a ported spool type were incorporated in the right foot valve block 192 in order to utilize the two double poppet valves for producing four motions. When the foot plate 12 is parallel to the unit longitudinal axis, as shown schematically in Fig. 12, the transfer valve ports are positioned to connect the conduits serving the finger actuating hydraulic cylinder 194 to the pressure and relief lines leading to the double-poppet control valves. In this position, depressing the toe operates one control valve to move piston 211 in one direction and depressing the heel operates the second control valve to move piston 211 in a reverse direction. Rotating the right foot pedal 12 to the right repositions transfer valves 209, 210 to disconnect finger actuating cylinder 194 and connect wrist actuating cylinder 195 to the double-poppet control valves. In this rotated position of foot pedal 12, depressing the toe or heel causes piston 212 to move in one direction or the other and thereby actuate the wrist turning device.

In the hydraulic arm actuator mechanism as constructed, the valve blocks are positioned under the foot pedals and the valves are arranged so that valve stem 198 is contacted by the foot pedal directly or through a simple lever arrangement in a manner not shown. The valves for controlling the elbow movement, since they were made responsive to a rotational movement of the left foot, are positioned horizontally in valve block 187 and the valve stems are contacted by lever arms attached at right angles to the pivoted foot pedal spindle or center post. It will be understood that here, as in the basic mechanical screw jack, arrangement of the control devices in order to take advantage of whatever muscular movement and control a partially paralyzed individual may possess is not limited to any particular arrangement, and the broad concept of the invention is applicable to the various adaptations and arrangement that may be found necessary to suit the invention to a particular individual.

Figure 15:
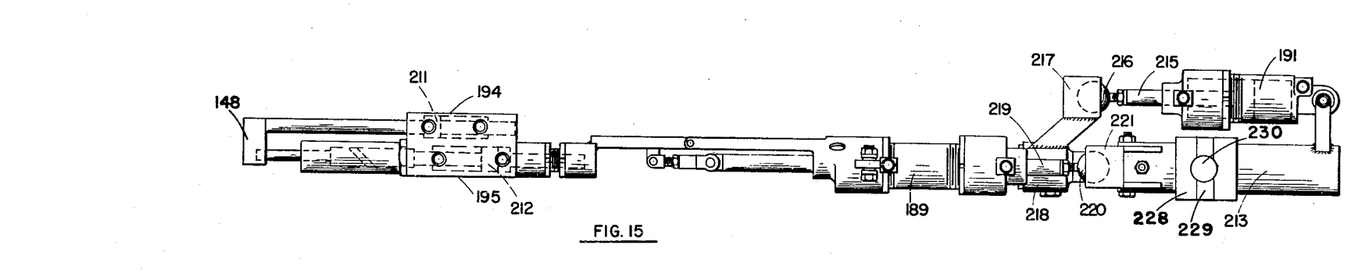
Fig. 15 is a top plan view of the hydraulic embodiment of the arm actuator device.

In this modification, the hydraulic power and control equipment including the pump, motor, reservoir, accumulator, control valves and switch-over valves are located in a compact housing upon a movable base plate. The foot pedals are mounted atop this housing and with the contacted valves are tilted angularly upward in a manner to allow comfortable operation by an invalid in a wheelchair. The base plate has a collar at each side for attaching the forwardly extending tubular members of the invalid's wheelchair to the apparatus by means of thumbscrews. Extending rearwardly and upwardly from the right side of the base plate and valve housing at an angle of approximately 45° is a built-up tubular structural support terminating in vertical shaft 74 to which is rigidly attached a collar for clamping horizontal support 213 of the arm actuator mechanism in position. The tubular structural support also carries the hydraulic conduits from the control valves to the upper end of the structure where they terminate in suitable connections. From these connections hydraulic fluid is conducted to and from the ports in the hydraulic actuator cylinders by means of flexible conduits. Combination relief and dump valve 185, in this embodiment, is located on the tubular structural support at a convenient location for manual operation of the dump valve by means of a lever attached to the operator's knee.

The arm of a normal individual when swung horizontally about the shoulder or when raised or lowered vertically tends to roll or rotate about its own axis to a certain extent. When the arm is swung inwardly toward the individual it tends to pronate or rotate so that the palm of the hand is down, and conversely when the arm is swung outwardly it tends to supinate or rotate so that the palm of the hand generally opens substantially upwardly. Similarly, when moving vertically upwardly, the arm tends to rotate a small amount so that the palm of the hand is generally substantially upward, and when the arm is lowered a reverse rotation takes place.

This rolling motion has been incorporated into the arm actuator mechanism by means of cam device 222. Bracket 227 is firmly attached on vertical shaft 74 at a point below collar 228 but is vertically and horizontally adjustable on the shaft. The bracket has a longitudinal adjustment slot having a bolt 226 extending vertically therethrough with cylindrical cam wheel 223 horizontally rotatably mounted on the upper end of the bolt at the top surface of bracket 227. Rocker shoe cam follower 224 is mounted on the bottom of fitting 218. The cam follower generally has a channel-shaped cross section with the two parallel sides having arcuate bottom edges. The parallel sides of follower 224 contact cam wheel 223 at their inner arcuate edges. Member 218 is fixedly attached to cam adjusting plate 225 which is fixedly, but angularly adjustably, mounted on the top surface of cam follower 224. Plate 225 and the arm actuator mechanism attached thereto are angularly disposed with respect to the longitudinal axis of cam follower 224. Provision has been made for a different bolting arrangement so that the relative degree of angularity of the arm actuator to cam follower 224 may be varied as required. This angularity combined with the rocking motion of the cam follower provides the rolling motion for the arm actuator. Cam follower 224 always maintains contact with cam 223 and slides and pivots about it.

In this modification as shown in Fig. 14, the arm actuator mechanism is pivotally mounted on the forward end of horizontal support 213 by means of universal joint 214. Support 213 is slidably mounted in collar 228 located on the upper end of vertical shaft 74. Collar 228 includes a thrust collar 229 for absorbing the thrust load due to the arm rolling cam mechanism 222 when the arm actuator is angularly offset with respect to cam follower 224. Collar 229 is adjustable by means of thumbscrew 230. As shown in Fig. 15, hydraulic actuating cylinder 191 for swinging the arm horizontally is rigidly but pivotally mounted on support 213 in the same horizontal plane but laterally offset therefrom. The piston in cylinder 191 acts through piston rod 215 on ball swivel 216 embedded in block 217 which is rigidly attached to member 218 forward of the universal joint. When the piston rod is progressively extended, the arm mechanism moves counterclockwise or toward the operator about the universal joint as a hinge. As the piston rod is retracted, the arm mechanism returns to its starting position in a clockwise direction. Fixedly but pivotally mounted on a vertically extending bracket above the elbow actuating cylinder 190 is the actuating cylinder 189 for controlling vertical movement of the arm. Piston rod 219 is attached to ball swivel 220 embedded in block 221 which is rigidly anchored to horizontal support 213. When the piston rod is progressively extended, the arm actuator mechanism is forced to move vertically downward and as the piston rod is retracted the arm moves upwardly. To permit free movement of this simulated shoulder joint without binding the center of each ball swivel and of the universal joint lies in the same transverse plane. With the exception of minor changes in linkage of the elbow bending portion of the arm actuator mechanism and the substitution of hydraulic actuating cylinders 190, 194 and 195 for the elbow, finger and wrist actuating screw jack mechanisms respectively, the remainder of the hydraulic arm mechanism (such as arm sling, wrist and finger support, finger actuating linkage and cam actuated wrist rotating mechanism, none of which are shown in Figs. 14 and 15) is all similar to that of the mechanical embodiment.

Fig. 13 is merely illustrative of the controlling foot motions used in the hydraulically operated embodiment of this invention.

A second modification of the basic mechanical screw jack operated mechanism embodying this invention consists in the application of a servo mechanism to control the operation of an electric driving motor which in turn is connected through a gear-reduction or transmission unit to a flexible drive cable for operation of a particular screw jack.

The servo control system is required to operate the arm actuator mechanism in two different modes: (1) holding a set position without movement against the force of gravity, and (2) movement in either direction at a rate proportional to the movement of the controlling foot pedal about one of its axes. The system herein described is for the control of one only of the flexible cable driven screw jack units. Consequently, one such servo system would be required for every pair of motions desired. In the basic screw jack actuated device of this invention, five such control systems would be required. Operation as heretofore described, would be by means of the foot pedals performing the same motions as previously described for the mechanical embodiment of the invention.

Figure 16:
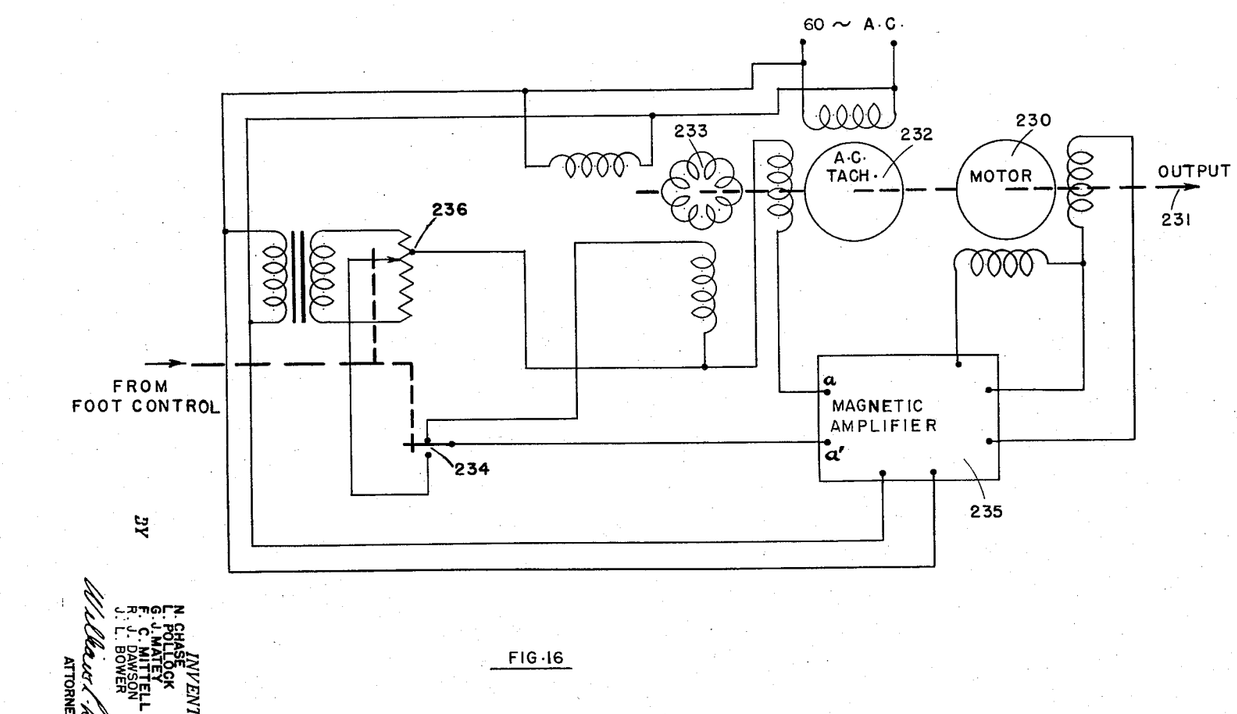
Fig. 16 is a wiring diagram for an electrical embodiment of a foot actuated control mechanism for the mechanically operated arm actuator device.

The control circuit is illustrated schematcally in Fig. 16. In holding a set position without movement against the force of gravity, the motor 230 is driven from the magnetic amplifier 235 in proportion and in a direction corresponding to the signal impressed at terminal pair $a$—$a'$. The force of gravity will normally tend to rotate the motor through the mechanical transmission 231. Such rotation will produce movement of the rotor of the variable coupling unit 233 which is constructed so that the coupling between its two coils will fluctuate approximately sinusoidally through many cycles per revolution. Thus, the motion of the shaft will cause a voltage to be induced in its output winding which is connected in series with the output winding of the A.C. tachometer 232 through the foot-operated switch 234 to terminals $a$—$a'$ of the magnetic amplifier 235. The voltage induced in the variable coupling unit will then be applied to the magnetic amplifier in such a direction as to return the shaft, and therefore the moved arm member, to a position of zero voltage in the variable coupling unit winding against the gravity force. The action of the tachometer signal in this case is to stabilize the closed servo loop involved.

In the second mode of operation for movement in either direction at a rate proportional to the movement of the controlling foot about one of its axes, the control of the motor is the same as above described except that the foot-operated switch is thrown into its lower position and thus connects the output of the foot actuated potentiometer 236 in series with the tachometer output and terminal $a$—$a'$ of the magnetic amplifier. This enables the operator, by moving the potentiometer off zero position, to set up a voltage in series with the tachometer and terminals $a$—$a'$ causing the motor to increase in speed until the tachometer signal is equal and opposite to the signal from the potentiometer. Thus, the speed is accurately controlled to be proportional to and in the same direction as the motion of the potentiometer. The magnetic amplifier is of a conventional design capable of supplying a small two phase motor in proportion to a supply A.C. signal on terminals $a$—$a'$.

The method of electrically controlling the operation of the mechanically actuated arm mechanism has the advantage of providing a great degree of sensitivity and requires a minimum of physical exertion on the part of the operator in comparison to the mechanical linkage and clutch system of the basic invention.

While particular embodiments of this invention have been illustrated and described herein, it will be apparent that various changes and modifications may be made in the construction and the arrangement of the various parts without departing from the spirit and

We claim:

1. A prosthetic-type device for producing controlled motion of the paralyzed or disabled arm of an individual comprising means adapted for attachment to the disabled arm of the individual for moving said arm about the shoulder joint in a direction having vertical and horizontal components; and means responsive to movement of the individual for controlling said moving means.

2. A prosthetic-type mechanism operated and controlled by a partially disabled individual for supporting and manipulating his own paralyzed or disabled arm in a manner controllable at the will of the individual comprising means adapted for attachment to the disabled arm of the individual for moving said arm about its shoulder joint; and means responsive to foot movement of the individual for controlling said moving means.

3. A prosthetic-type mechanism operated and controlled by a partially disabled individual for supporting and manipulating his own paralyzed or disabled arm in a manner controllable at the will of the individual comprising means adapted for attachment to the disabled arm of the individual for moving said arm in a horizontal direction about the shoulder joint; and means responsive to movement of the individual for controlling said moving means.

4. A prosthetic-type mechanism operated and controlled by a partially disabled individual for supporting and manipulating his own paralyzed or disabled limb in a manner controllable at the will of the individual comprising means adapted for attachment to the disabled arm of the individual for moving said arm in a vertical direction about the shoulder joint; and means responsive to controlled foot movements of the individual for controlling said moving means.

5. A prosthetic-type mechanism operated and controlled by a partially disabled individual for supporting and manipulating his own paralyzed or disabled natural arm in a manner controllable at the will of the individual comprising means adapted for attachment to the disabled arm of the individual for moving said arm about its shoulder joint in a direction having vertical and horizontal components; and means responsive to movement of the individual for controlling said moving means.

6. A prosthetic-type mechanism operated and controlled by a partially disabled individual for supporting and manipulating his own paralyzed or disabled limb in a manner controllable at the will of the individual comprising means adapted for attachment to the disabled arm of the individual for individually and simultaneously moving said arm about its shoulder joint and bending and straightening the arm at the elbow; and means responsive to controlled foot movements of the individual for controlling said moving means.

7. A prosthetic-type mechanism operated and controlled by a partially disabled individual for supporting and manipulating his own paralyzed or disabled limb in a manner controllable at the will of the individual comprising means adapted for attachment to the disabled limb of the individual for individually and simultaneously moving said arm about its shoulder joint, flexing the arm at the elbow and rotating the wrist; and means responsive to movement of the individual for controlling said moving means.

8. A prosthetic-type mechanism operated and controlled by a partially disabled individual for supporting and manipulating his own paralyzed or disabled limb in a manner controllable at the will of the individual comprising means adapted for attachment to the disabled arm of the individual for individually and simultaneously moving said arm about its shoulder joint, flexing the arm at the elbow, rotating the wrist and moving the fingers; and means responsive to controlled foot movements of the individual for controlling said moving means.

9. A prosthetic-type device for producing controlled motion of the paralyzed or disabled limb of an individual comprising means adapted for attachment to the disabled arm of the individual for moving said arm in a vertical direction about its shoulder joint and for imparting a simultaneous rolling motion thereto; and means responsive to movement of the individual for controlling said moving means.

10. An external prosthetic-type device for producing controlled motion of the paralyzed or disabled natural limb of an individual comprising means adapted for attachment to the disabled limb of the individual for moving said limb in a combined horizontal and vertical direction and for imparting a simultaneous rolling motion thereto, and means responsive to movement of the individual for controlling said moving means.

11. A phosthetic-type device for producing controlled motion of the paralyzed or disabled arm of an individual comprising means adapted for attachment to the disabled arm of the individual for simultaneously moving said arm in a direction having both vertical and horizontal components, simultaneously rotating said arm, simultaneously moving the elbow of said arm, simultaneously rotating the wrist of said arm and simultaneously moving the disabled fingers of the individual; and means responsive to movement of the individual for controlling said moving means.

12. A prosthetic-type device for producing controllable motion of the paralyzed or disabled natural limb of an individual comprising means responsive to applied external forces for supporting and actuating the disabled limb of the individual to produce normal useful functional movements of the limb, said external force responsive means comprising hydraulic cylinders having hydraulically actuated pistons slidable therein; means for applying external forces to said actuating means, said external force applying means comprising a closed hydraulic system including a hydraulic pump, a motor for driving the pump, a reservoir containing hydraulic fluid and having the pump mounted therein, a hydraulic accumulator connected to the pump discharge for the storage of pressurized fluid, and conduits connecting the pump discharge and accumulator to said hydraulic cylinders; and means responsive to movement of the individual for controlling the application of the external forces to said actuating means.

13. A device as described in claim 12 wherein the means for controlling the application of the external forces to said hydraulic cylinders and hydraulically actuated pistons comprises metering valves having projecting valve stems and controlling the amount of hydraulic fluid flowing to and from each hydraulic cylinder; and foot actuated pedals having motions in predetermined directions about their axes and operatively contacting the projecting valve stems of said metering valves to control the operation of said pistons.

14. A prosthetic-type device for producing controllable motion of the paralyzed or disabled natural limb of an individual comprising means responsive to applied external forces for supporting and actuating the disabled limb of the individual to produce normal useful functional movements of the limb; means for applying external forces to said actuating means; and means responsive to movement of the individual for controlling the application of the external forces to said actuating means, the means responsive to movement of the individual for controlling the application of the external forces to said actuating means comprises a servo mechanism including a foot actuated potentiometer.

15. A device as described in claim 14 wherein the means for applying external forces to said actuating means comprises a driving motor whose speed and direction of rotation is controlled by means of the servo mechanism; and a power transmission unit connected to and driven by said motor and operatively connected to said actuating means.

16. A prosthetic-type device for supporting and moving the paralyzed or disabled natural limb of an individual through an infinitely variable series of individual or combined motions, controllable by the individual to produce any particular motion desired by him, comprising means adapted for attachment to the disabled arm of the individual for selectively and simultaneously performing any one or more of the following operations: moving the upper arm in a direction having both vertical and horizontal components, rotating the arm while moving it horizontally, bending and straightening the elbow, rotating the wrist of said arm, and moving the fingers to open and close the grasp of the individual's hand; and means responsive to foot movements of the individual for controlling said operation performing means.

17. An external prosthetic-type device for producing controlled motion of the paralyzed or disabled natural arm of an individual comprising means for supporting and actuating said disabled arm in a manner to produce normal useful functional articulation of the limb in a plurality of different modes; and foot pedal means simultaneously movable about its principle axes to control said supporting and actuating means, said foot pedal means being responsive to foot movements of the individual and operable thereby to simultaneously effect controlled movement of said arm through at least one of the different operational modes.

18. A device adapted to be placed in predetermined juxtaposition to a wheelchair and operable by an invalid occupant thereof for producing articulation of the paralyzed or disabled natural arm of such invalid comprising means adapted for attacment to the invalid's disabled arm for supporting and manipulating said arm through normal functional movements in a manner controllable at the will of the invalid, said means including a portion for moving the arm about the shoulder joint; and means responsive to foot movements of the invalid for controlling said manipulating means.

19. A device adapted to be placed in predetermined juxtaposition to a wheelchair and operable by an invalid occupant thereof for producing controlled motion of the paralyzed or disabled natural arm of such invalid comprising means adapted for attachment to the invalid's disabled arm for supporting and manipulating said arm simultaneously through a plurality of normal functional movements in a manner controllable at the will of the individual, and means responsive to movements of the individual for controlling said manipulating means, said controlling means having a plurality of selective simultaneously actuable motions about its principle axes.

20. A device adapted to be placed in predetermined juxtaposition to a wheelchair and operable by the invalid occupant thereof for producing articulation of the paralyzed or disabled natural arm of such invalid comprising means adapted for attachment to the invalid's disabled arm for supporting and actuating said disabled arm in a manner to produce normal useful functional movements of the arm which are controllable at the will of the individual, said means including a portion for moving the arm about the shoulder joint, and means responsive to pivotation of at least one of said invalid's feet for controlling said actuating means.

21. A device adapted to be placed in predetermined juxtaposition to a wheelchair and operable by the invalid occupant thereof for producing articulation of the paralyzed or disabled natural arm of such invalid comprising means adapted for attachment to the invalid's disabled arm for supporting and manipulating said arm through normal functional movements in a manner controllable at the will of the individual, said means including a portion for moving the upper arm about the shoulder joint, a portion for producing elbow flexion, a portion for producing hand pronation and supination and a portion for producing opening and closing of the fingers, and means responsive to movement of the invalid for controlling said manipulating means.

22. An external prosthetic-type device for producing controlled motion of the paralyzed or disabled natural arm of an individual comprising means adapted for attachment to the disabled arm of the individual for producing movement of the upper arm about the shoulder joint, elbow flexion, hand pronation and supination, and opening and closing of the fingers, such movements being producible individually or simultaneously in any combination thereof, and means responsive to foot movements of the individual for controlling said motion producing means.

23. An external prosthetic-type device for producing controlled motion of the paralyzed or disabled natural arm of an individual comprising means adapted for attachment to the disabled arm of the individual for producing functional movements of the limb including movement of the upper arm about the shoulder joint, elbow flexion, hand pronation and supination, and opening and closing of the fingers, individually or simultaneously and in any combination thereof; and means responsive to foot movements of the individual for controlling said motion producing means, said controlling means having a plurality of selective simultaneously actuable individual motions about its principle axes, each said individual motion controlling a particular mode of arm movement.

24. An external prosthetic-type device for producing controlled motion of the paralyzed or disabled natural arm of an individual comprising means adapted for attachment to the disabled arm of the individual for producing motion of said arm including movement of the upper arm about the shoulder joint, elbow flexion, hand pronation and supination and finger opening and closing movements all in any combination thereof; and foot pedal means for controlling said motion producing means, said pedal means having a plurality of selective simultaneously actuable individual motions about orthogonal axes with each said individual motion controlling the particular mode of arm movement.

25. A device adapted to be placed in predetermined juxtaposition to the wheelchair and operable by the invalid occupant thereof for producing articulation of the paralyzed or disabled natural arm of such invalid comprising means adapted for attachment to the invalid's disabled arm for supporting and manipulating said arm through normal functional movements in a manner controllable at the will of the individual, said means including a portion for moving the arm about the shoulder joint, said portion further including a means for providing pronation and supination of the invalid's arm to effect movement of the arm in a natural manner when it is moved vertically and horizontally about the shoulder joint; and means responsive to movement of the invalid for controlling said manipulating means.

References Cited in the file of this patent

UNITED STATES PATENTS

| | | |
|---|---|---|
| 2,528,464 | Wilkerson | Oct. 31, 1950 |
| 2,553,277 | Robinson | May 15, 1951 |
| 2,580,987 | Alderson | Jan. 1, 1952 |
| 2,679,649 | Alderson | June 1, 1954 |
| 2,681,650 | Goss | June 22, 1954 |
| 2,842,774 | Vitt | July 15, 1958 |